July 3, 1956 — C. H. MILLER — 2,752,635
VENTING OF FOAMED LATEX MOLDS
Filed Aug. 4, 1949

Inventor
Charles H. Miller

ATTORNEY

United States Patent Office 2,752,635
Patented July 3, 1956

2,752,635

VENTING OF FOAMED LATEX MOLDS

Charles H. Miller, Akron, Ohio, assignor, by mesne assignments, to The Goodyear Tire & Rubber Company, a corporation of Ohio Application August 4, 1949, Serial No. 108,504

5 Claims. (Cl. 18—39)

This invention relates to molds for forming articles composed of plastic material, such as foamed latex and the like, and more particularly to the cover plate therefor. Molds of this type are employed to form foamed latex into cushions for seats and backs for automobiles and furniture, and are also used in the manufacture of mattresses and the like.

Previous apparatus for forming foamed latex articles had incorporated therein various forms of top plates such as solid plates, plates with vent holes formed therethrough, and wire screen or other types of open top plate.

The solid plates did not permit trapped air or gases to escape, but permitted same to accumulate in various areas, causing depressions or cavities in the surface of the article to be formed, the cause of many pieces being rejected.

The plates provided with vent holes formed therethrough were unsatisfactory because the holes would fill with the material being formed before all of the air and gases had escaped, permitting cavities to mar the surface in the same manner as the solid plates although to a lesser degree.

Th open meshwork type of cover plate is not desirable for, due to the expansion under heat and contraction when cooled, it is difficult to maintain accurate dimensions and the proper density of the body being formed.

The object of this invention is to overcome previous difficulties by providing a top plate for a mold that will properly vent trapped air and gas from the cavity thereof so that the body being formed will be under such control that the proper proportions and density of the body will be assured and that cavities caused by trapped air will be eliminated.

The aforesaid object and advantages of the invention, and other objects which will become apparent as the description proceeds, are achieved by providing a top plate which cooperates with a bowl for containing the material and in which the article is formed.

The top plate forms the top closure for the bowl and consists of a plate having core pins mounted on its inner side, the plate being provided with a formation of scores or grooves which extend across the inner side thereof, intersecting with one another and extending to the edges of the plate whereby trapped air and gas is vented to the outside atmosphere from the entire upper surface of the body being formed.

For a better understanding of the invention reference should be had to the accompanying drawing in which.

Figure 1:
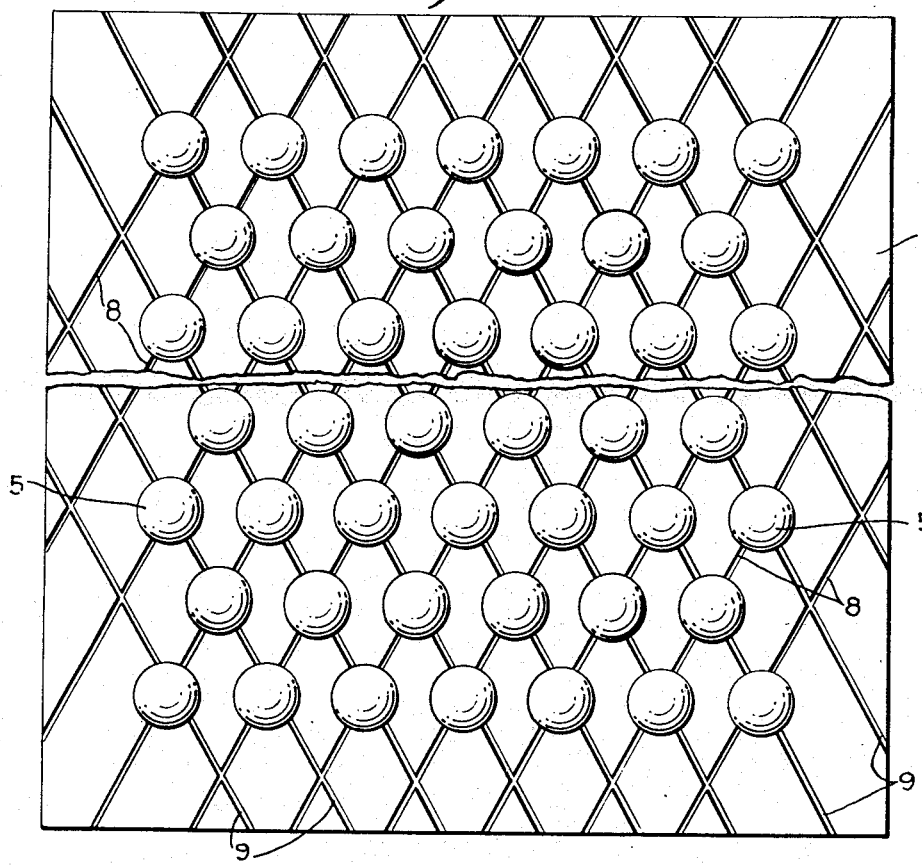
Fig. 1 is a bottom view of the top plate of the molding apparatus showing the venting scores therein.
Figure 2:
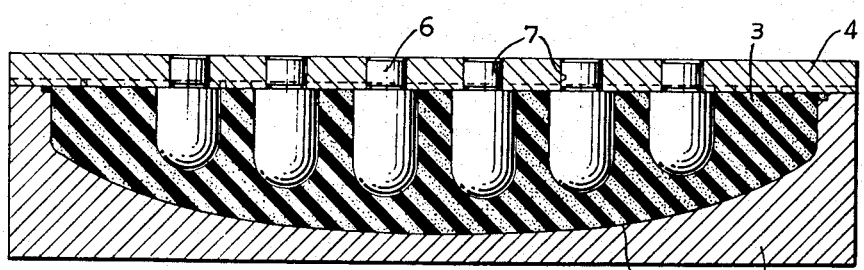
Fig. 2 is a sectional view of the bowl with the top plate in place.

Referring to the drawing, the numeral 1 indicates the bowl or mold into the cavity 2 of which is poured the foamed latex 3. The bowl may be of various shapes and dimensions, depending upon the form of the article being molded. The top plate 4 is formed from plate metal and formed to fit the upper contour of the bowl, the edges of which coincide with the upper edges of the bowl 1. Disposed on the under side of the cover plate 4 are a plurality of core pins 5 arranged in spaced apart relation to one another. The core pins are provided with shouldered ends 6 which extend into bores 7 provided therefor in the cover plate 4. The shouldered ends 6 are secured in the plate by being provided with a drive fit, or the ends and bores may be threaded, or any other well-known means of attachment may be used.

The core pins 5 extending from the under side of the plate 4 into the cavity 2 of the bowl 1 are for the purpose of providing cored openings in the bottom of the article being formed. This provides a uniform cushioning effect and also saves material.

The cushion or other article is formed in an upside-down position, the top and sides of the cushion or other article being formed by the walls of the cavity in the bowl. When the material is poured into the cavity, air and gases have a chance to escape from beneath the material, but when the top plate is placed over the bowl and the foamed latex therein, air from the atmosphere and gases emitting from the foamed latex are trapped between the bottom of the cover plate and the foamed latex which, if allowed to remain, would form cavities and irregularities and a generally bad appearance and the article will not be uniform in density.

These defects in the cushion or other article being molded are eliminated by providing scores or grooves in the under side of the cover plate 4. The grooves extend diagonally across the under side of the plate as illustrated in Fig. 1, comprising a plurality of diagonally formed grooves 8 which cross a plurality of diagonally formed grooves 9. Both sets of grooves extend diagonally from one edge of the plate to another edge through which trapped air may escape from all portions of the surface of the article in contact with the under surface of the cover plate.

Figures 3, 4:
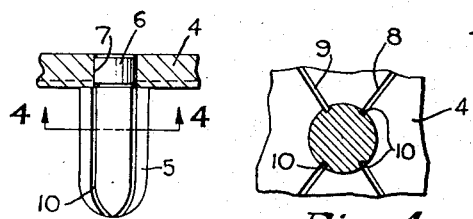
Fig. 3 is a detail view of one of the core pins.
Fig. 4 is a section taken on the line 4—4 of Fig. 3.

In some instances it is desirable to also form venting grooves in the core pins as illustrated in Figs. 3 and 4 to prevent air or gas from forming cavities in the bottom of the openings formed by the core pins. The grooves 10 in the core pins 5 extend from the base and intersect at the ends or apexes and are spaced to coincide with the grooves in the bottom of the cover plate so that trapped air or gases may have a continuous path to the outer edges of the cover plate. It has been found in practice that grooves from one-sixteenth to three thirty-seconds of an inch in width and depth give the best results.

When a cushion or other article is to be molded, the foamed latex is poured into the bowl in a predetermined amount, a slight alowance being made for the displacement of material by the core pins. The surface of the material is then leveled off by means of a scraper, and the top plate is positioned over the bowl. Due to displacement by the core pins, the material will rise to contact the grooved surface of the cover plate whereupon the trapped air and gas is forced into and through the grooves to the outside of the mold. When the foamed latex contacts the under grooved side of the cover palte and the mold is subjected to heat to set the foamed mass into the desired solidified form, the foamed latex will slightly adhere to the surface of the plate, the adhesion being sufficient to prevent settling or shrinkage. This assures the proper density and size of the article being molded. When the article is vulcanized, it may easily be removed or striped from the top plate without tearing and will have no other defects caused by trapped air or gases.

From the foregoing it will be apparent that by providing venting grooves in the cover plate, an article such as a cushion or mattress may be molded so that the surfaces will be smooth and even without cavities or other defects caused by trapped air, will possess the desired density, and the size and form will be of the proper dimensions.

While certain representative embodiments and details have been shown for the purpose of illustrating the invention, it will be apparent to those skilled in the art that various changes and modifications may be made therein without departing from the spirit or scope of the invention.

I claim:

1. In a mold embodying a body having a cavity formed therein to receive the material to be molded and a cover member having a series of spaced grooved core pins disposed thereon projecting into the cavity when the members are assembled together, means facilitating the removal of trapped air and gaseous accumulations from the body and adjacent the surfaces of the plastic material to be molded comprising a plurality of grooves formed on the inner surface of the cover member from which the several core pins project said grooves arranged to extend in spaced generally parallel relation to each other entirely across the surface of the cover member in a common plane and interconnecting the several core pins thereon, and a second set of parallel grooves extending entirely across the surface of the cover member arranged to intersect the first mentioned grooves.

2. A mold structure of the type defined in claim 1 in which each core pin has at least one axially formed groove therein for interconnection with a groove formed in the inner surface of the cover member.

3. A top cover plate for a mold for molding foamed latex articles in combination with a lower bowl in which the foamed liquid latex is contained, comprising a plate having a network of grooves formed in its under side, core pins having grooves in the core pins formed in the surface thereof, said grooves connecting with the grooves in the plate to permit trapped air between the under side of said plate and the foamed latex to escape to the atmosphere to prevent cavities forming in the surface of the article being molded due to the accumulation of gases emitting from the cells of the article being molded.

4. A molding structure for molding porous plastic material without pressure thereon embodying a bowl for receiving and defining the dimensions of the article to be molded, and a cover-plate positioned over said bowl, said cover-plate having a plurality of spaced core pins projecting into said bowl from the inner side of said cover-plate, means for venting gas accumulations from the body of the article being molded and adjacent the surfaces thereof under no pressure, said venting means comprising sets of grooves formed in the plane inner surface of the cover-plate and extending between the core pins and from one edge to another of the cover-plate, the grooves of each set extending in the same general direction but at an angle to the grooves of another set, the grooves of one set intersecting the grooves of another set, said intersecting grooves in each set being of dimensions that will permit the free passage of gases therethrough and axially extending grooves in the core pins connecting with the grooves in the cover-plate.

5. A mold for forming objects from cellular sponge latex and the like having intercommunicating cells under substantially zero externally applied pressure, comprising complementary mold sections forming a mold recess one of said sections forming one side of the mold recess having grooves formed in the surface thereof of a width in the order of $1/16''$ to $3/32''$ and sufficiently deep to restrict the entrance of the cellular sponge into said grooves to an extent sufficient to completely fill the grooves, whereby a space remains in the grooves to permit passage of escaping gases through said grooves, said grooves communicating with openings extending from said grooves to the atmosphere externally of the mold, and grooved core pins mounted on said grooved surface, the grooves of which communicate with the grooves in said first surface.

References Cited in the file of this patent

UNITED STATES PATENTS

| | | |
|---|---|---|
| 588,926 | Owens | Aug. 24, 1897 |
| 1,826,945 | McKay et al. | Oct. 13, 1931 |
| 2,026,940 | Hendryx | Jan. 7, 1936 |
| 2,190,807 | Steinberger | Feb. 20, 1940 |
| 2,296,744 | Simmons | Sept. 22, 1942 |
| 2,340,278 | Sudman | Jan. 25, 1944 |
| 2,351,529 | Luxenberger et al. | June 13, 1944 |
| 2,380,380 | Bacon | July 31, 1945 |
| 2,452,382 | Long | Oct. 26, 1948 |
| 2,476,831 | Spencer | July 19, 1949 |
| 2,542,025 | Goss | Feb. 20, 1951 |